US012688301B1

(12) United States Patent
Colon et al.

(10) Patent No.: US 12,688,301 B1
(45) Date of Patent: Jul. 21, 2026

(54) APPLICATION RISK IDENTIFICATION AND REMEDIATION UTILIZING A LANGUAGE MODEL

(71) Applicant: Amazon Technologies, Inc., Seattle, WA (US)

(72) Inventors: Brendan Cruz Colon, Seattle, WA (US); Matthew Michael Sommer, Friday Harbor, WA (US); Consuelo Manas Pilot, Ponte Vedra, FL (US); Dustin Michael Ingalls, Isaquah County, WA (US); Adam Edward Powers, El Dorado Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 94 days.

(21) Appl. No.: 18/542,153

(22) Filed: Dec. 15, 2023

(51) Int. Cl.
*G06F 21/57* (2013.01)
*G06F 21/56* (2013.01)
*G06F 21/60* (2013.01)

(52) U.S. Cl.
CPC .......... *G06F 21/577* (2013.01); *G06F 21/563* (2013.01); *G06F 21/60* (2013.01); *G06F 2221/033* (2013.01)

(58) Field of Classification Search
CPC ...... G06F 21/577; G06F 21/563; G06F 21/60; G06F 2221/033
USPC .......................................................... 726/25
See application file for complete search history.

(56) References Cited

U.S. PATENT DOCUMENTS

| | | | | |
|---|---|---|---|---|
| 10,607,015 B1* | 3/2020 | Hecht | | G06F 9/54 |
| 11,968,088 B1* | 4/2024 | Yan | | H04L 41/0823 |
| 2019/0132334 A1* | 5/2019 | Johns | | G06F 21/562 |
| 2025/0110711 A1* | 4/2025 | Palanki | | G06F 8/35 |
| 2025/0110855 A1* | 4/2025 | Rudenko | | G06F 8/35 |

* cited by examiner

*Primary Examiner* — Bryan F Wright
(74) *Attorney, Agent, or Firm* — KNOBBE, MARTENS, OLSON & BEAR, LLP

(57) ABSTRACT

Aspects of the present disclosure enable a system to perform automated risk analysis of source code of applications. The system may include a machine learning model to analyze the source code. The machine learning model may output an application risk value. Further, the application risk value may be used to determine a remedial action. The remedial action may address a risk associated with the application risk value, or allow for publication of the application.

20 Claims, 5 Drawing Sheets

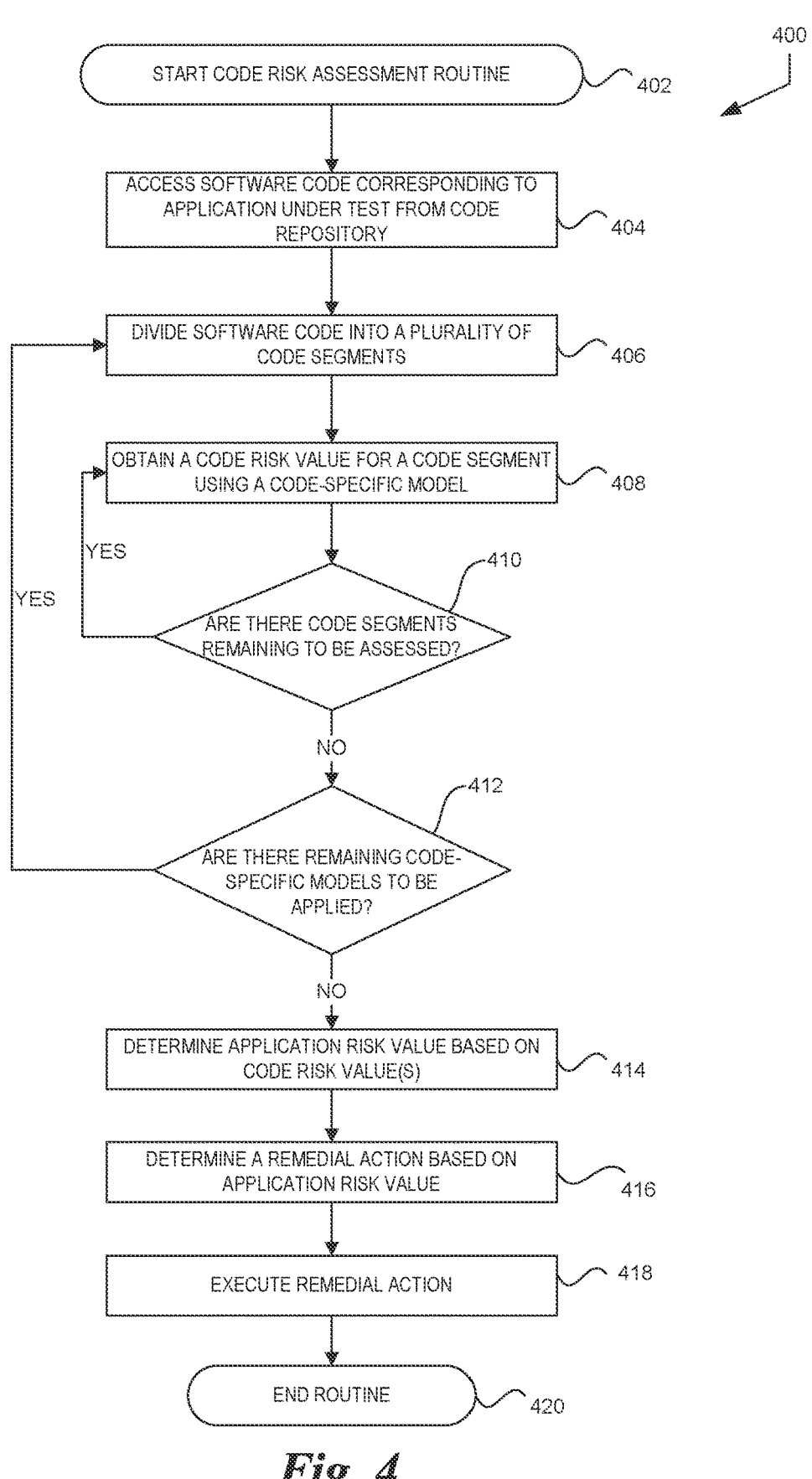

400

START CODE RISK ASSESSMENT ROUTINE 402

ACCESS SOFTWARE CODE CORRESPONDING TO APPLICATION UNDER TEST FROM CODE REPOSITORY 404

DIVIDE SOFTWARE CODE INTO A PLURALITY OF CODE SEGMENTS 406

OBTAIN A CODE RISK VALUE FOR A CODE SEGMENT USING A CODE-SPECIFIC MODEL 408

ARE THERE CODE SEGMENTS REMAINING TO BE ASSESSED? 410
YES
YES
NO

ARE THERE REMAINING CODE-SPECIFIC MODELS TO BE APPLIED? 412
NO

DETERMINE APPLICATION RISK VALUE BASED ON CODE RISK VALUE(S) 414

DETERMINE A REMEDIAL ACTION BASED ON APPLICATION RISK VALUE 416

EXECUTE REMEDIAL ACTION 418

END ROUTINE 420

*Fig. 4*

APPLICATION RISK IDENTIFICATION AND REMEDIATION UTILIZING A LANGUAGE MODEL

BACKGROUND

Computing systems can store software code which may present varying levels of risk when executed. For example, software code may access sensitive information associated with an organization in an insecure manner, bypass a security protocol, or allow access to a secure network to an unauthorized user.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

FIG. 4 is a flow diagram of an illustrative routine for performing a software risk analysis and executing a remedial action according to some embodiments.

DETAILED DESCRIPTION

Figure 1:
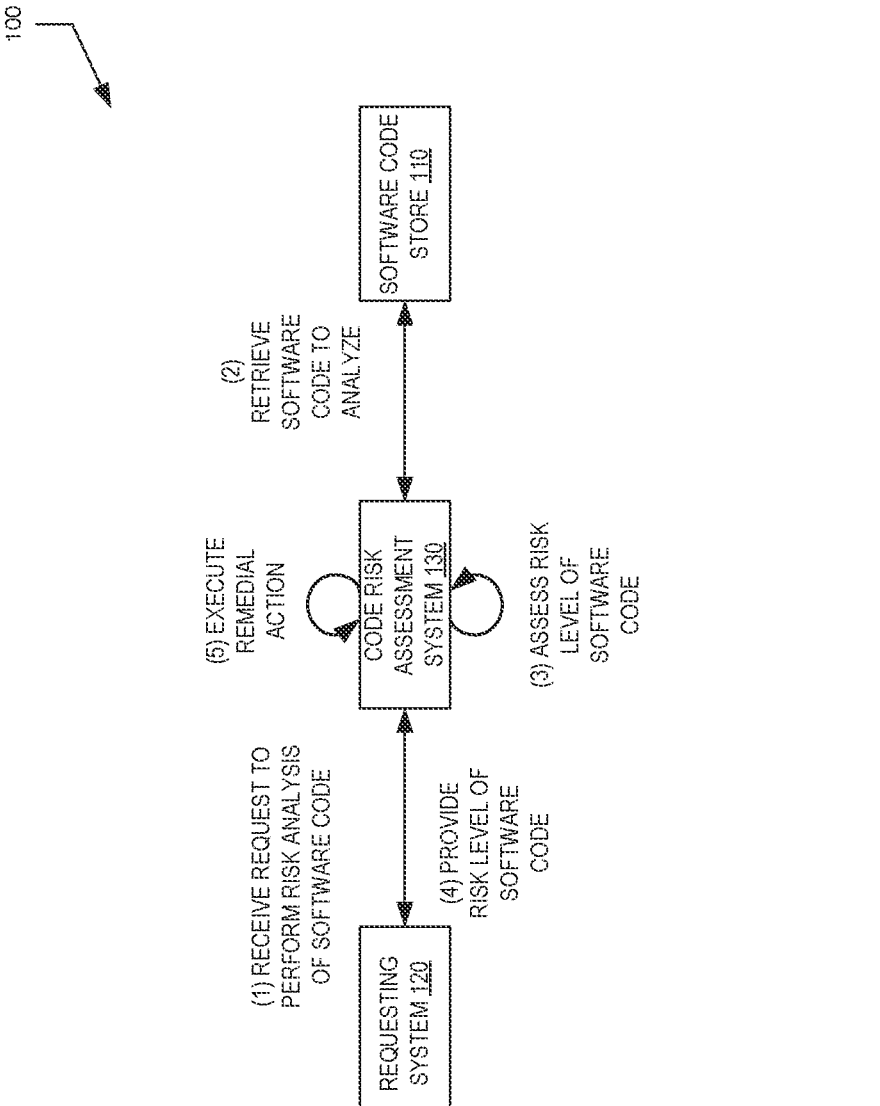
FIG. 1 is a block diagram of an illustrative process for identifying and remediating software risks according to some embodiments.

The present disclosure relates to risk assessment of an application by a code risk assessment system that is configured to perform risk assessment of software code using a machine learning model or ensemble of machine learning models.

Some systems allow for the provider of an application to assign a risk value to the software code. The risk value may be a binary indication of risk, for example "high risk" or "low risk." Alternatively, the risk value may be a value on a scale indicating a range of risk values. For example, the scale may be a set of colors, where each color is associated with a risk level of the software code. In another example, the scale may be numeric, with a range of numbers (e.g., 1 to 10) where an increasing numerical value indicates an escalating level of risk, or vice versa. The risk value may be used to determine a level of security privileges to provide to the application, such as access to sensitive or personal information. Additionally, the risk value may be used to determine whether the application should be published for use, internally to an organization or externally to outside users. Such uses of the risk value may, in some cases, create an incentive to underreport the risk value of the application. Underreporting of the risk value may lead to a non-secure application being provided access to information to which it should not have access, or to be published for use when such publication may present a security risk.

Some alternative systems allow for the manual review of an application to determine a risk value. However, manual review can be slow, leading to significant delays in publishing applications for use. Moreover, as some software applications or software ecosystems can be large (e.g., including millions or billions of lines or code, if not more), manual review can be impractical if not impossible. Additionally, manual review may require specialized skills and training which may result in reviewers being unable to identify all possible security vulnerabilities in an application. Further, new security vulnerabilities are identified frequently, which may require manual reviewers to undergo constant training. Such training may not be sufficient to allow manual reviewers to recognize all new security vulnerabilities. Some systems may address such problems by requiring multiple manual reviewers. The use of multiple reviewers may further delay the time to publish an application, and result in inconsistent assessments of the risk value associated with the application which must be resolved.

Additionally, some systems may allow for an application to be updated after the risk value has been assigned. However, such systems may not require an updated risk assessment of the application, leaving a previous risk value in place even when security and/or privacy-related portions of the application have been updated. The previous risk value may be left in place even though the updated application would otherwise have had a higher level of risk assigned to it had the updated application been reviewed. Such systems may allow risky applications to operate, presenting potential security and privacy risks to the system and users of the system.

Aspects of the present disclosure enable a system to perform an assessment of a risk value associated with an application for a large number of applications in a significantly reduced amount of time, and may perform such assessments in an automated manner. The applications may be part of a set of applications offered internally or externally by an organization. The system may perform the assessment of the risk associated with the application using a machine learning model. The machine learning model may be a large language model. The large language model may be a code-specific large language model, and may be fine-tuned to assess the risk value of an application according to a rating system used by the organization.

Advantageously, the use of a machine learning model may allow for significant improvements in the accuracy of the risk value assigned to an application, by removing the ability of an application developer to self-report a risk value, and further by reducing or eliminating the need for manual review of at least portions of the application. Additionally, the system may operate faster than a manual review process, thereby increasing the efficiency with which applications can be reviewed, increasing the speed of application deployment, and increasing the number of lines of code that can be reviewed within a particular time frame. Manual review may also lead to misidentification of a risk, for example a manual reviewer may misidentify the path of sensitive data and assess that the sensitive data use is limited to a secure data storage location when in fact the sensitive data is available to non-secured storage or processing elements, thereby creating a risk of sensitive data becoming available to an attacker or the public. A machine learning model may be capable of correctly tracing the path of sensitive data throughout its use in an application, avoiding such a risk. Sensitive data may include, but is not limited to, data activities which could affect human safety (e.g., data that is used to control a robot, determine at least a portion of a treatment plan for a disease, or any other data which could affect human safety), personally identifiable information, financial information, data stored in a secure data storage location, or a private cryptographic key. In some cases, the sensitive data is not limited to data but may include code or portions of code of an application. For example, any code that may relate to the control or operation of equipment that can affect human safety may be identified as sensitive and can be included in the sensitive data.

Additionally, machine learning models trained to perform risk assessment may be able to recognize new vulnerabilities which attempt to exploit previously unknown vulnerabilities that may be present in an application. Recognizing new vulnerabilities or potential attack vectors may be achieved based on the ability of the machine learning model to understand source code and identify an outcome of running source code even when the vulnerability is semantically and/or syntactically different from previous known vulnerabilities, for example by identifying a similarity between the outcome of the source code of the new vulnerability and existing vulnerabilities on which the machine learning model was trained. Such an ability to recognize new vulnerabilities may allow the system to provide information useful to application developers to improve the security of applications generally. Further, the use of a machine learning model allows for consistency in the risk rating of applications, by providing for a scalable system for application risk assessment.

In some embodiments, there may be a limit to the size of the input of the machine learning model. The risk assessment system may divide the source code associated with the application under test into code fragments, where each code fragment satisfies the input size limit of the machine learning model. The risk assessment system may then provide the code fragments to the machine learning to determine a risk level of the code fragment. When the risk assessment system has assigned a risk value to the code fragments, the system may then generate an overall risk value for the application under test. The overall risk value may be determined based on a threshold number, or percentage, of code fragment risk values being reached. Further, there may be several thresholds, each defining a code risk value of the range of code risk values to be assigned to the application under test. Alternatively, the overall risk value may be a highest risk value of a code fragment of the application, an average of at least a portion of the risk values assigned to code fragments of the application, or any combination of risk values assigned to code fragments (e.g., median risk value, mode risk value, weighted average of risk values, etc.).

Further, the system may perform an updated risk assessment of an application when the application has been modified. The system may be configured to receive an indication of a change to the application, or to monitor updates made to an application source code storage location in order to automatically initiate risk assessment when an update is made. Advantageously, the system may be used to automatically monitor a cloud-based service provider's application storage and inform developers using the cloud-based service of risks associated with source code they have uploaded.

Additionally, the system may identify specific types of vulnerabilities present in an application. For example, the machine learning model of the system may be fine-tuned to identify authentication types (e.g., multi-factor authentication, single-factor authentication), cross site scripting vulnerabilities, and/or other vulnerability types. In some embodiments, an ensemble of machine learning models may be used to identify vulnerabilities or other risks present in software code. For example, a first machine learning model may be configured to identify a keyword associated with a type of sensitive information, and a second machine learning model may be configured to identify a cross-site scripting vulnerability. The system may then combine a risk value determined by each machine learning model to generate an overall risk value for the application.

When a risk or vulnerability has been identified by the risk assessment system, the system may then perform a remedial action to address the identified risk or vulnerability. For example, the system may identify a location of a risk within source code of an application and provide the location for further review by an automated or manual system. In another example, the system may be configured to automatically update the source code, such as by changing a single-factor authentication instance to use multi-factor authentication instead. Further, the system may provide an indication of a difference between an assessed risk value determined by the system through risk analysis and a previously assigned risk value.

As used herein, the term risk may include several different risk types. Risk type may refer to a sensitivity of information accessed by software code (e.g., personally identifiable information, confidential information, secret information such as cryptographic keys, etc.), a method used to enable access to information (e.g., single-factor authentication, multiple-factor authentication, password requirements, etc.), a vulnerability type (e.g., cross-site scripting, buffer overflow, etc.), a likelihood that a vulnerability will allow access to sensitive information, and the like. Risk level, as determined by the risk assessment described in the present disclosure, may then be based in part on a risk type, and/or the way the software code interacts with the risk type. For example, software code accessing personally identifiable information may be assigned a high risk value. Alternatively, if multi-factor authentication and encryption are used to protect personally identifiable information, the software code may be assigned a moderate or low risk value. In another example, cross-site scripting vulnerabilities may be assigned a high risk value no matter how the cross-site scripting vulnerability is exposed, due to the heightened risk to systems interacting with software code having a cross-site scripting vulnerability. Further, code which is not associated with a risk type may be generally assigned a low risk value. For example, software code which only interacts with its own internal data to provide information, such as software code enabling an application for teaching an individual the bones of the body, and which does not allow interaction with the underlying computing system or other computing systems, may be assigned a low risk value. Additionally, a vulnerability which may generally be assigned a moderate risk value may instead be assigned a high risk value if the application interacts with sensitive data.

Risk values may also change throughout the lifecycle of an application. For example, an application may initially be assigned a low risk value because the application interacts only with internal information in a secure manner that minimizes user interaction, thereby limiting potential vulnerabilities. The application may then be updated, after being assigned an application risk value, to require a user account which includes personally identifiable information for users of the application. The new interaction with personally identifiable information may then result in the application having a higher assessed risk value due to the new risk type resulting from the update.

To aid in understanding the present disclosure, it may be helpful to consider a language model as a machine learning model configured to understand and/or generate human-readable languages. Language models may be based on a probabilistic model for language generation. A large language model (LLM), then, is a language model which has been trained on a larger set of data. The term large may refer to the number of parameters exceeding that of a language model, and/or the size of the training set exceeding that used to train a language model. LLMs are generally capable of providing more natural responses in a human language than a language model, and may work with different types of human language including languages used in programming (e.g., Python, C++, etc.). As used herein, a code-specific LLM is a large language model capable of interpreting software code (e.g., codet5, CodeLLAMA, STARCoder, etc.). For example, the tokenizer of the LLM may be trained to recognize and parse the syntax of software code.

Various aspects of the disclosure will be described with regard to certain examples and embodiments, which are intended to illustrate but not limit the disclosure. Although aspects of some embodiments described in the disclosure will focus, for the purpose of illustration, on particular examples of machine learning models, fine-tuning methods, remedial actions, and the like, the examples are illustrative only and are not intended to be limiting. In some embodiments, the techniques described herein may be applied to additional or alternative types of machine learning models, fine-tuning methods, remedial actions, and the like. Additionally, any feature used in any embodiment described herein may be used in any combination with any other feature or in any other embodiment, without limitation.

Example Software Risk Analysis and Remedial Action Execution Process

With reference to an illustrative example, FIG. 1 shows example process 100 for performing risk analysis of software code and executing a remedial action based on the analysis. The process 100 begins at (1) where a requesting system 120 transmits a request to perform a risk analysis of software code to a code risk assessment system 130. The request may include, but is not limited to, an indication of an application associated with the software code, a software code store 110 where the software code to be analyzed is stored, a risk to analyze the software code for, and/or an indication of a machine learning model to use for the analysis.

At (2), the code risk assessment system 130 retrieves software code from the software code store 110 on which to perform the requested risk analysis. Retrieving the software code from the software code store 110 may be performed, for example, by the code risk assessment system 130 transmitting a code request for the software code to the software code store 110, which may include an indication of a file path for the software code and/or an indication of an application enabled by the software code. The software code store 110 may then locate the software code in storage and transmit the software code to the code risk assessment system 130.

At (3), the code risk assessment system 130 assesses the risk level of the retrieved software code. Assessing the risk level of the retrieved software code may be performed using a machine learning model. In some embodiments, the machine learning model is a large language model. Further, the large language model may be a code-specific large language model that may be fine-tuned to identify one or more types of risk in software code. In additional embodiments, the machine learning model may have an input size limit, for example where the machine learning model is a large language model, there may be a limit on the number of tokens the large language model can accept as input. Where such an input size limit exists, the code risk assessment system 130 may determine whether the software code to be analyzed satisfies the input size limit. If the software code to be analyzed exceeds or otherwise fails to satisfy the input size limit of the machine learning model, the code risk assessment system 130 may divide the software code into a plurality of code segments where each code segment is smaller than the input size limit. The code risk assessment system 130 may then perform risk analysis on each code segment of the plurality of code segments to generate a plurality of code risk values, each code risk value associated with a code segment of the plurality of code segments. In some embodiments, the code risk assessment system 130 uses a plurality of machine learning models to determine code risk values for the plurality of code segments. For example, a first machine learning model may assess the plurality of code segments for cross-site scripting vulnerabilities, and a second machine learning model may assess the plurality of code segments for code which may impact human safety (e.g., control code for a motor of a robot operating in a shared environment with a human, decision-making code in a healthcare related application, etc.). A third machine learning model may assess the plurality of code segments for code that accesses personally identifiable information. And a fourth machine learning model may assess the plurality of code segments for code that accesses financial information. Each machine learning model may then assign code risk values to the plurality of code segments. The code risk assessment system 130 may then use the plurality of code risk values to determine an overall application risk value for the software code. The assessment of the risk level of software code will be described in additional detail in relation to FIGS. 2 and 4.

At (4), the code risk assessment system 130 provides the risk level of the software code. For example, the risk level may be provided as a color indicating a severity of the assessed risk (e.g., a set of colors where green indicates low risk, orange indicates a moderate risk, and red indicates a severe risk). Alternatively, the risk level may be provided as a numerical value associated with a scale for assessing risk level (e.g., a scale ranging from 1 to 10, where 1 is the lowest risk level and 10 is the highest risk level). In another example, the risk level may be provided as a natural language description of a risk associated with the software code, and the risk level may be generated by a large language model (e.g., the large language model may output a phrase describing the type and/or severity of the assessed risk in natural language). The provided risk level description may be based in part on a technical understanding of the system or user to which the risk level assessed by the code risk assessment system 130 will be provided. The examples presented herein of providing the risk level of the software code are intended to be illustrative and not limiting, it should be recognized that there are various alternative methods which may be used to indicate the risk level of software code.

At (5), the requesting system 120 or the code risk assessment system 130 may execute a remedial action based on the code risk assessment provided by the code risk assessment system 130. For example, the code risk assessment system 130 may provide an update to the software code stored in the software code store 110 intended to correct an error or vulnerability associated with an elevated risk level. Alternatively, the code risk assessment system 130 may provide an indication of a remedial action to correct a vulnerability or other issue with the software code which resulted in a high risk level being assessed. In another example, the remedial action may be the code risk assessment system 130 placing software code in a priority review queue of the requesting system 120, indicating that the software code requires further review to address an assessed risk, such as by a second machine learning model configured to address the type of risk of the assessed risk (e.g., the use of single factor authentication instead of multi-factor authentication, unencrypted use of secure information, etc.).

Example Software Code Risk Analysis System

Figure 2:
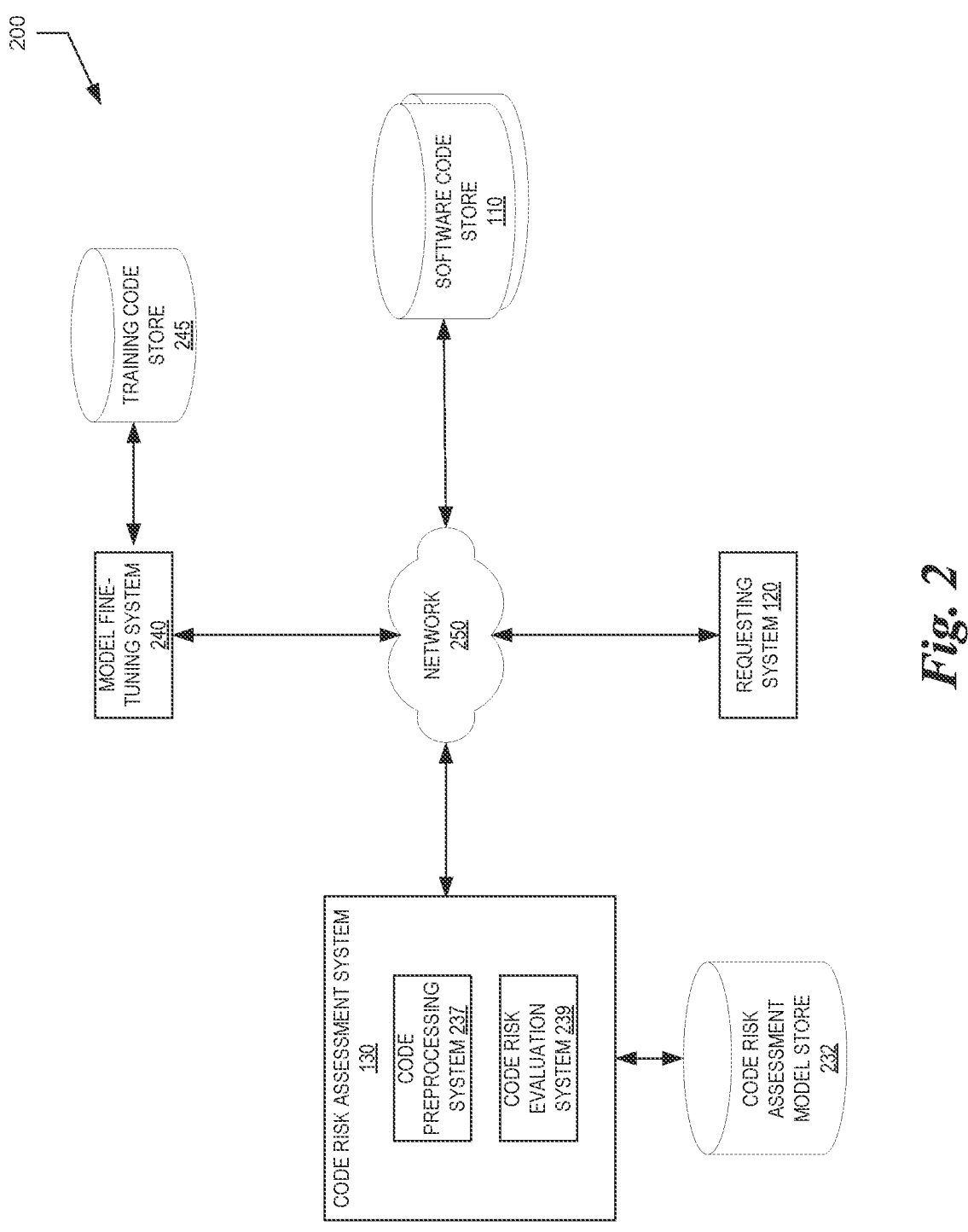
FIG. 2 is a block diagram of a system for identifying and remediating software risks according to some embodiments.

With reference to an illustrative example, FIG. 2 shows a system 200 for providing software code risk analysis. The example system 200 includes a code risk assessment system 130 in communication with a code risk assessment model store 232, a requesting system 120, at least one software code store 110, a network 250, and a model fine-tuning system 240.

The code risk assessment system 130 is configured to retrieve software code for risk assessment, and to perform the risk assessment of the software code. The code risk assessment system 130 includes a code preprocessing system 237, and a code risk evaluation system 239. Further, the code risk assessment system 130 may be in communication with a code risk assessment model store 232, as described below.

The code preprocessing system 237 is configured to retrieve software code from the software code store 110 based on a request received, for example, from the requesting system 120. The code preprocessing system 237 may transmit a request for the software code to the software code store 110 via the network 250, and in response receive the requested software code from the software code store 110 via the network 250. The code preprocessing system 237 may analyze the software code to identify and remove comments, white space, inoperable code (e.g., a code segment where there is a bracket mismatch), and the like. Additionally, the code preprocessing system 237 may prepare the retrieved software code for risk assessment. For example, where a machine learning model used to perform risk assessment has an input size limit, the code preprocessing system 237 may divide the software code into code segments where each code segment is below the input size limit such that each code segment may be assessed for risk by the machine learning model. Further, the code preprocessing system 237 may manage transmitting the code segments to the code risk evaluation system 239 for evaluation, and maintaining the association between the code segments and their assessed risk levels. Maintaining the association between the code segments and assessed risk levels may assist the code risk assessment system 130 in generating an overall application risk level for the application under test associated with the source code. The code preprocessing system 237 may also be configured to maintain associations with the software code in the resulting code segments. For example, code within a loop, a function, object definition, and the like, may be divided into a same code segment where the same code segment would not exceed the input size limit of the machine learning model of the code risk evaluation system 239. The code preprocessing system 237 may also be configured to ensure consistency between inputs to the code risk evaluation system 239, such as by providing an additional prompt, or dividing code segments according to a set of rules to assist the performance of the code risk evaluation system 239.

The code risk evaluation system 239 is configured to generate a risk assessment for the source code. In some embodiments, the code risk evaluation system 239 may retrieve a code risk assessment model from the code risk assessment model store 232. In some embodiments, the code risk evaluation system 239 may retrieve a code risk assessment model based on the request for the risk assessment, information associated with the application under test, and/or information associated with the source code. For example, the code risk evaluation system 239 may retrieve a machine learning model configured for a risk type, a code type, a request type, etc. In some embodiments, a model will be stored by the code risk evaluation system 239 to be used for risk assessment of the source code. To perform the risk assessment, the code risk evaluation system 239 may apply the source code as input to the machine learning model. Additionally, the code risk evaluation system 239 may generate a prompt for the machine learning model to be provided in addition to the code. The prompt may provide additional context, and/or an output format for the risk assessment. In embodiments in which the source code exceeds the input size limit of the model, the code risk evaluation system 239 may apply the portions of the source code generated by the code preprocessing system 237 as input to the machine leaning model, and may request a next portion after a current portion has been assessed for risk until all portions for which risk assessment is to occur have undergone assessment. Further, where the source code exceeds the input size limit of the machine learning model, the code risk evaluation system 239 may generate prompts for each portion of the source code to indicate a relationship between the portions, a context for the portion to be assessed (e.g., information on related function calls), and/or metadata for a file from which the code portion was generated.

The code risk assessment model store 232 is configured to store one or more machine learning models used to perform risk assessment of source code. The machine learning models of the code risk assessment model store 232 may be fine-tuned models, for example fine-tuned models generated from a code-specific LLM. The code risk assessment model store 232 may additionally store information associated with the one or more machine learning models useful for identifying and providing a machine learning model based on a context of a risk assessment to be performed by the code risk assessment system 130. For example, the code risk assessment model store 232 may store metadata for a model indicating the type of risk for which the machine learning model was fine-tuned.

The requesting system 120 is a computing device from which a request to perform a risk assessment of an application under test is received. The request may include some or all of the source code of the application under test, or may include information useful for locating the source code for the application (e.g., a file path). In some embodiments, the requesting system 120 may comprise the code risk assessment system 130.

The software code store 110 is configured to store source code for an application under test. The software code store 110 may additionally store metadata associated with the source code, for example indicating a past risk assessment level, a language of the source code, a last update time of the source code, etc.

The model fine-tuning system 240 is configured to fine-tune a machine learning model to perform risk assessment of source code. The model fine-tuning system 240 may be in communication with a training code store 245. The model fine-tuning system 240 may receive a request to fine-tune a machine learning model, for example a code-specific LLM, to perform a source code risk assessment. The machine learning model to be fine-tuned may be stored by the model fine-tuning system 240, received from the requesting system 120, received from the code risk assessment model store 232, and/or received from another source (e.g., from a model creator). Fine-tuning may be used to prepare the machine learning model to recognize one or more types of vulnerabilities, data types (e.g., private data, secured data, encrypted data), uses of data types, security protection mechanisms (e.g., multi-factor authentication, encrypting data before transmission, requiring a security measure to access private data, etc.). The model fine-tuning system 240 may load a machine learning model to be fine-tuned into a memory of the model fine-tuning system 240. The model fine-tuning system 240 may request training code from the training code store 245 and apply the training code to the machine learning model in order to perform fine-tuning. In some embodiments, the model fine-tuning system 240 may be the same system as the requesting system 120 and/or the code risk assessment system 130.

The network 250 may be a publicly-accessible network of linked networks, some or all of which may be operated by various distinct parties, for example the Internet. In some cases, network 150 may include a private network, personal area network, local area network, wide area network, cellular data network, satellite network, etc., or some combination thereof. In some cases, the network 150 may be or may include the Internet.

Example Software Risk Analysis Model Training Routine

Figure 5:
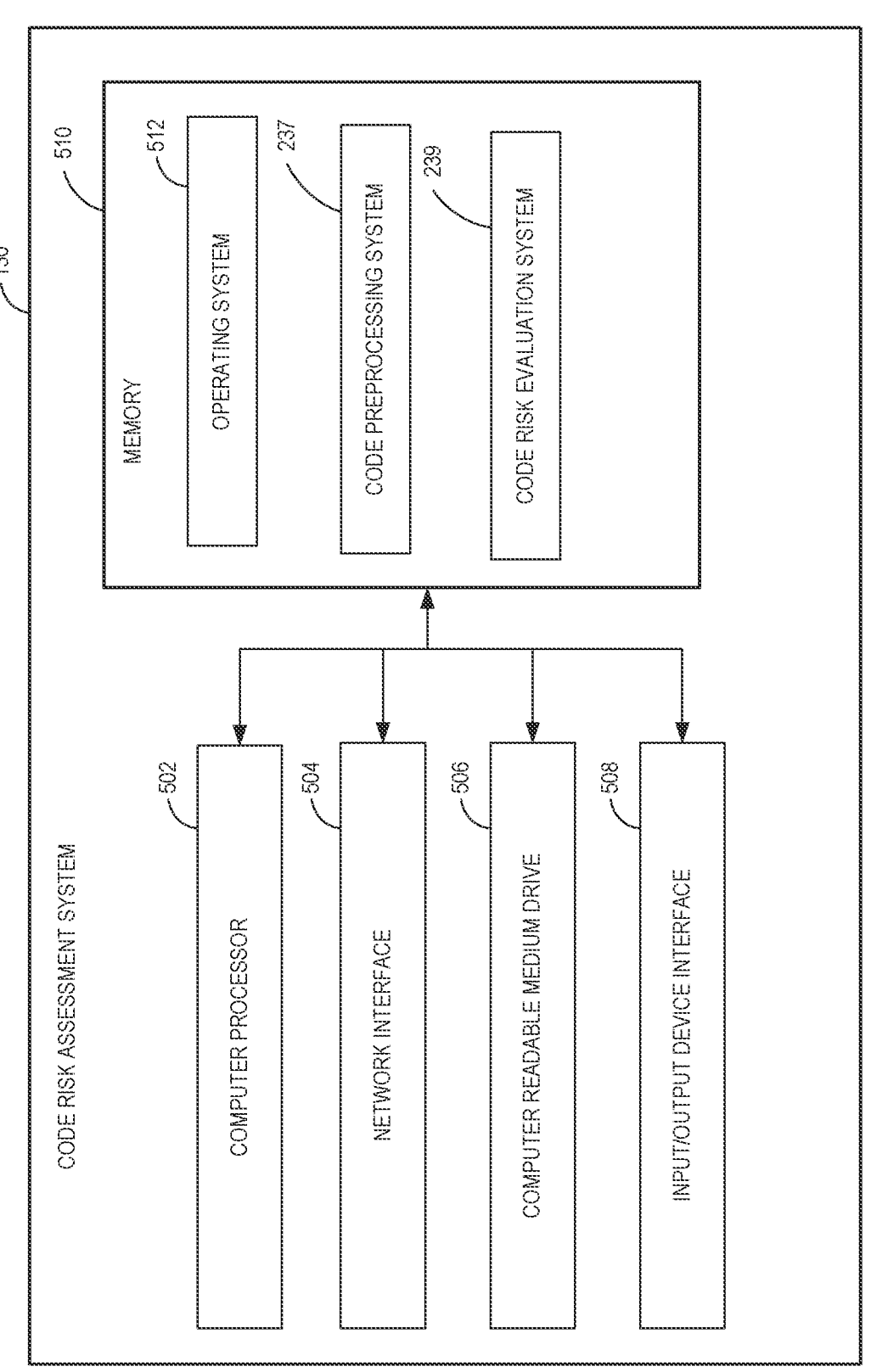
FIG. 5 is a block diagram of an illustrative computing system configured to perform software risk analysis according to some embodiments.

When a routine described herein (e.g., routine 300 and 400) is initiated, a set of executable program instructions stored on one or more non-transitory computer-readable media (e.g., hard drive, flash memory, removable media, etc.) may be loaded into memory (e.g., random access memory or RAM) of a computing device, such as the memory of the code risk assessment system 130 shown in FIG. 5 or the model fine-tuning system 240, and executed by one or more processors. In some embodiments, the routine 300, and 400, or portions thereof may be implemented on multiple processors, serially or in parallel.

Figure 3:
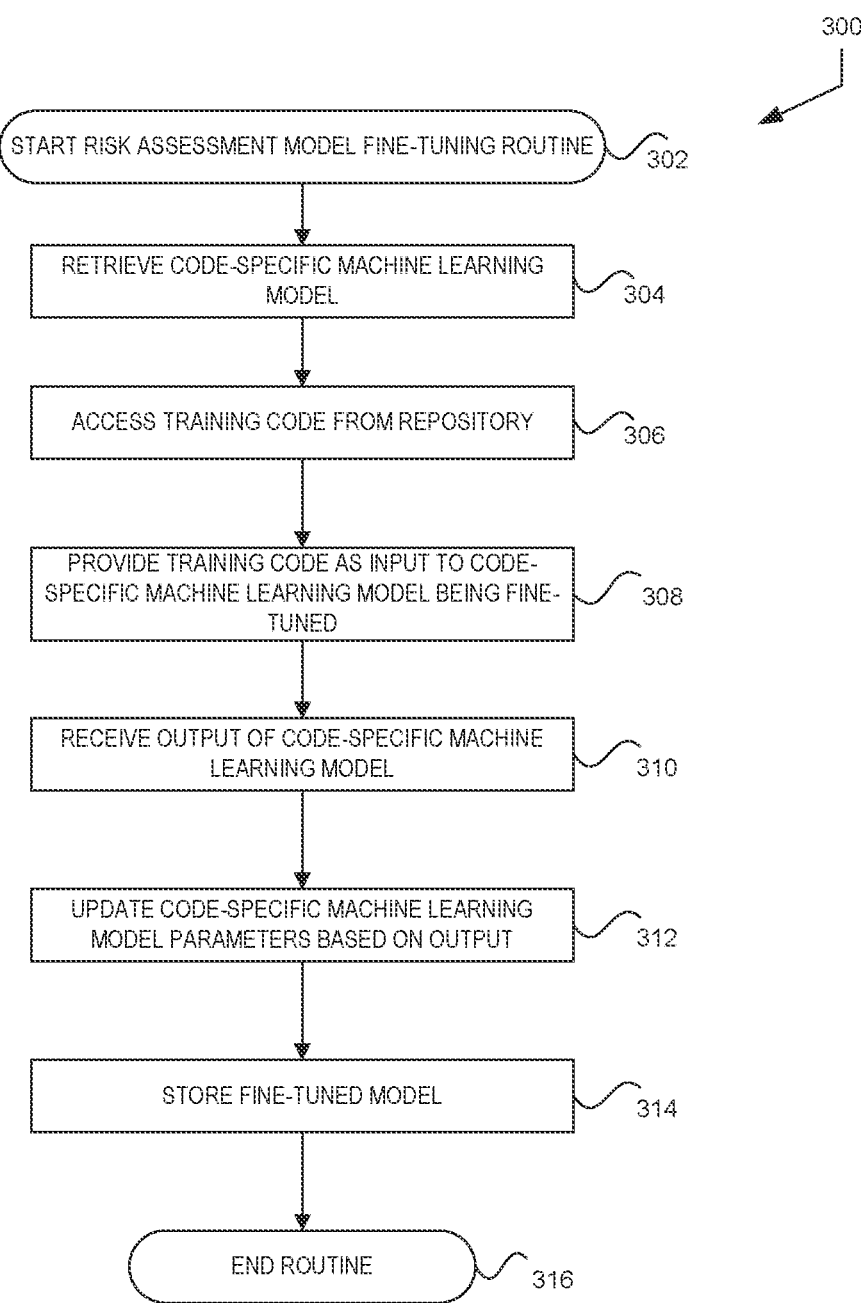
FIG. 3 is a flow diagram of an illustrative routine for training a software analysis model according to some embodiments.

FIG. 3 illustrates example routine 300 for fine-tuning a machine learning model to perform code risk assessment, for example a machine learning model of the code risk evaluation model store 232, using the model fine-tuning system 240. The routine 300 begins at block 302, for example in response to a request to fine-tune a code-specific large language model for use in assessing risks present in source code associated with an application under test. The request may additionally indicate a risk and/or vulnerability for which the code-specific large language model is to be fine-tuned. For example, a first code-specific machine learning model may be fine-tuned to identify cross-site scripting vulnerabilities, a second code-specific large language model may be fine-tuned to identify authentication types (e.g., single-factor authentication), and a third code-specific machine learning model may be fine-tuned to identify the use of personal identifiable information (PII). While the routine 300 describes one method for fine-tuning a machine learning model, it should be understood that various alternative methods of fine-tuning the machine learning model may be used as well. For example, types of fine-tuning may include, but are not limited to, transfer learning, multi-task learning, adaptive fine-tuning, behavioral fine-tuning, text-to-text fine tuning, and the like. Additionally, while fine-tuning of a code-specific machine learning model is described herein, alternative embodiments of the present disclosure may train a machine learning model to perform code risk assessment.

At block 304, the model fine-tuning system 240 retrieves a code-specific machine learning model to be trained, for example from the code risk assessment model store 232 or from another system storing a code-specific machine learning model. The code-specific machine learning model may be retrieved based on the request. The request may indicate a code-specific machine learning model to be fine-tuned. Alternatively, the model fine-tuning system 240 may be associated with a code-specific machine learning model. The code-specific machine learning model may be fine-tuned multiple times, and each fine-tuned version may be stored for use in a code type, a code language, software code associated with an organization, and/or a vulnerability. In some embodiments, the model fine-tuning system 240 may also add one or more additional layers of a neural network to the retrieved code-specific machine learning model. The fine-tuning process may then involve adjusting parameters associated with the additional layers (e.g., weights associated with connections between nodes of one or more layers).

At block 306, the model fine-tuning system 240 accesses training code from the training code store 245 for use in fine-tuning the code-specific machine learning model. The training code may be accessed based on the request. The training code may be selected from the training code store 245 based on a goal of the fine-tuning, for example fine-tuning the model to recognize a type of vulnerability. Further, the training code may be associated with an organization requesting the fine-tuning, or the training code may be publicly available data (e.g., from a publicly available code repository). Additionally, the training code may be labelled, such as by a human reviewer or an automated system (e.g., a machine learning model configured to label training code). Alternatively, the training code may be unlabeled. In some embodiments, at least a portion of the training code may be generated by a machine learning model.

At block 308, the model fine-tuning system 240 provides the training code as input to the code-specific machine learning model being fine-tuned. Providing the training code to the code-specific machine learning model causes the model to begin performing analysis on the training code and generating outputs. The model fine-tuning system 240 may additionally provide contextual or other information in the form of a prompt to the code-specific machine learning model to assist in the fine-tuning process. In embodiments where the code-specific machine learning model has an input size limit, the model fine-tuning system 240 may divide the training code into a plurality of code segments where each code segment is below the input size limit of the model and provide the code segments to the model as input.

At block 310, the model fine-tuning system 240 receives the output of the code-specific machine learning model generated based on the provided training code. For example, the output of the code-specific machine learning model may be a risk assessment of the provided input, an indication of a location associated with an assessed risk, a textual display providing an indication of a code portion associated with a risk, a risk type, and/or a suggested code change to address an assessed risk. The output may be used for comparison to an expected output for the improvement or training of the model.

At block 312, the model fine-tuning system 240 updates model parameters of the code-specific machine learning model based at least in part on the output of the machine learning model in response to the training code. For example, parameters of the code-specific machine learning model may be updated through backpropagation based on comparison of the output of the model to an input training code and an expected output of the model associated with the input training code. Alternatively, where one or more layers of a machine learning model are connected to the output of a code-specific machine learning model, and the one or more layers are the portion of the machine learning model undergoing fine-tuning, the parameters of the one or more layers may be updated based on the output of the code-specific machine learning model altered by the one or more layers. In some embodiments, updating the code-specific machine learning model parameters may include generating an ensemble machine learning model, where the ensemble machine learning model combines the outputs of two or more machine learning models, for example by the use of one or more additional layers of a machine learning model.

At block 314, the model fine-tuning system 240 stores the updated code risk assessment model, for example in the code risk assessment model store 232, for future use in performing code risk assessment of source code. The updated code risk assessment model may be stored along with additional information related to the updated code risk assessment model. For example, the model fine-tuning system 240 may provide an indication of the type of training code used to fine-tune the updated model, a type of risk for which the updated model is fine-tuned, an input size limit, a number of model parameters, a base model from which the updated model was generated by fine-tuning, or any other information useful for assessing the updated code risk assessment model's suitability for conducting a risk assessment. When the model fine-tuning system 240 has stored the updated code risk assessment model in the code risk assessment model store 232, the routine 300 moves to block 316 and ends.

Example Software Risk Analysis Routine

FIG. 4 illustrates example routine 400 for performing code risk assessment using a machine learning model of the code risk assessment model store 232 and the code risk assessment system 130. The routine 400 begins at block 402, for example in response to a request from the requesting system 120 received by the code risk assessment system 130 to perform a risk assessment of an application. The request may include, for example, an identity of the application, a type of risk to be assessed, and/or an expected output format of the risk assessment. The request may be generated automatically by a system. For example, the request may be generated in response to a code submit, a request to publish software code, based on a time since the software code was previously published (e.g., a periodic request, point in time request, randomized interval request, etc.), based on a newly identified risk, based on an event related to the software code occurring, and/or in response to an update to the software code being made. Alternatively, the request may be made by a user, for example by interacting with a user interface provided by the requesting system 120.

At block 404, the code risk assessment system 130 accesses code corresponding to the application under test from a code repository, for example the software code store 110. Accessing the source code may include the code risk assessment system 130 transmitting a request to retrieve the source code to the software code store 110 and receiving the source code in response to the request.

At block 406, the code risk assessment system 130 using, for example, the code preprocessing system 237 divides the software code into a plurality of code segments. The code risk assessment system 130 may divide the software code into code segments having a size less than or equal to a maximum input size of a machine learning model used to perform the risk assessment (e.g., a fine-tuned code-specific machine learning model stored in the code risk assessment model store 232). The code risk assessment system 130 may store a maximum input size for the machine learning model, or may request the maximum input size from another system (e.g., the code risk assessment model store 232). In some embodiments, the code preprocessing system 237 may perform additional analysis of the software code before dividing the software code into the plurality of code segments, and the code preprocessing system 237 may generate code segments only for a portion of the software code. For example, when a software code includes a plurality of functions, the code preprocessing system 237 may analyze the functional contexts represented in the software code so that it may divide the software code into code segments which include information associated with one function of the plurality of functions. Dividing the software code in this way maintains a functional context of the code segment by including code associated with a particular functional context in the same code segment.

Additionally, the code preprocessing system 237 may analyze the software code to identify the types of data accessed, and divide the software code into code segments based at least in part on a type of data accessed. For example, by dividing code into a code segment including the accessing and storing of secure data. Further, the code preprocessing system 237 may identify portions of the software code that are functionally duplicates or that are similar within a threshold degree, and may generate one representative code segment for the functionally similar portions of software code. Functionally similar portions of the software code may be identified, for example, based on the use of similar or the same application programming interface (API) calls, transmitting and/or receiving information of a same or similar security or privacy level (e.g., personally identifiable information, key values associated with private key cryptography, etc.), referencing similar or the same functions, requesting similar or the same type of information (e.g., address information, telephone numbers, IP addresses, etc.) from different sources, or any other portion of software code using a same or similar method to achieve a like result in a similar security or privacy context. In some embodiments, the software code as a whole may be of a size less than the maximum input size of the code risk assessment model, and the code risk assessment system 130 may then provide the entire source code as a single code segment.

In some embodiments, the code preprocessing system 237 may analyze the software code to identify a keyword, or key phrase. The code preprocessing system 237 may select a keyword to be identified in the software code based on a code-specific machine learning model, where the code-specific machine learning model may be configured to determine a risk value for code associated with the keyword or phrase. Alternatively, the code preprocessing system 237 may be configured to identify keywords in the code (e.g., from a list of keywords) and then indicate to the code risk evaluation system 239 keywords which have been identified. The code risk evaluation system 239 may then select a code-specific machine learning model associated with the identified keyword. The code-specific machine learning model associated with the keyword or phrase may then be used to conduct the code risk assessment for at least code segments where the keyword or phrase is identified. The list of keywords may be generated by a user (e.g., an administrator) and/or may be determined using a machine learning model that may identify keywords based on the probability that a code segment or application is associated with a particular risk level when a particular keyword is included. The keywords may include any type of word that may be determined to affect the risk level or sensitivity of code. For example, the keywords may be a financial related word (e.g., credit card, bank account, etc.), a PII related word (e.g., social security number, address, name, etc.), or any other type of word that may cause further analysis of a code segment. Moreover, the keyword can include numbers, symbols, variables, or any other alphanumeric entry that may be included in software code and that can be associated with the sensitivity of code.

The code preprocessing system 237 may divide code into code segments. These code segments may include a segment or window of code that is at least partially centered around an identified keyword or phrase. The window of code may be centered on the keyword or phrase, such that the code segment includes an equal number of characters before and after the keyword or phrase. Alternatively, the window of code may be a function or other code structure that includes the keyword or phrase and may or may not be centered around the keyword. In another example, code preprocessing system 237 may generate the window around the keyword or phrase where the location of the keyword or phrase is determined to allow for improved performance of the code-specific machine learning model which will perform the risk assessment (e.g., the keyword may be located in the last 10% of the window). Further, the same keyword may be associated with a plurality of code-specific machine learning models, and the code preprocessing system 237 may generate different code segments including different windows around the keyword for each code-specific machine learning model associated with the keyword. Moreover, in some cases, a particular portion of code may be included in multiple at least partially overlapping windows of code because, for example, multiple keywords may be found within the code. These at least partially overlapping windows of code may be processed by multiple code-specific machine learning models with each of the code-specific machine learning models associated with a different keyword included within the at least partially overlapping windows of code.

For example, a machine learning model may be fine-tuned to identify risks associated with the use of credit card information. The code preprocessing system 237 may then identify portions of the software code including the key phrase "credit card" and generate a code portion including code relevant to the key phrase (e.g., a 2000 character window around the key phrase, where the key phrase is used to determine the center of the window within the software code). The code preprocessing system 237 may provide code segments containing the key phrase to the code-specific machine learning model associated with the key phrase, and may not provide code portions where the key phrase is not included to the code-specific machine learning model associated with the key phrase. An at least partially overlapping portion of the code that includes the keyword "credit card" may be supplied to another code-specific machine learning model if another keyword is identified, such as "home address." In some cases, the window of code that includes "credit card" and that includes "home address" is the same.

But in other cases the window of code may be overlapping but not identical, or completely different.

At block 408, the code risk evaluation system 239 of the code risk assessment system 130 obtains a code risk value for a code segment using a code-specific machine learning model (e.g., a fine-tuned code-specific model stored by the code risk assessment model store 232). The code risk value may be, for example, a color of a color scale where different colors are associated with different risk levels, a number of a numerical scale where increasing or decreasing numerical values indicate a level of risk, and/or a text description of a risk (e.g., high risk, moderate risk, do not publish, no significant risk found, etc.). The code risk evaluation system 239 may provide additional information with the generated code risk value. For example, the code risk evaluation system 239 may include an indication of a portion of the code segment which led to the code risk value assigned to the code segment (e.g., a line number of the code segment or software code, a portion of the code segment associated with the code risk value, and/or a modified visual display of the source code or code segment where the indicated portion is visually distinct from the surrounding text). In an additional example, the code risk evaluation system 239 may include an indication of a risk type associated with the code segment, such as indicating a type of authentication (e.g., single-factor authentication), a type of data (e.g., personally identifiable information, a private key value, confidential information, etc.), and/or a level of encryption associated with the code segment.

At decision block 410, the code risk evaluation system 239 determines whether there are code segments of the source code for the application under test remaining to be assessed. If there are code segments remaining to be assessed, the routine 400 returns to block 408. If all code segments which are to be assessed have been assessed by the code risk evaluation system 239, the routine 400 moves to block 412.

At decision block 412, the code risk assessment system 130 determines whether there are remaining code-specific machine learning models to be applied to the software code. For example, a first code-specific machine learning model may be configured (e.g., by fine-tuning as described in relation to FIG. 3) to identify cross-site scripting vulnerabilities, and a second code-specific machine learning model may be configured to identify code previously identified as presenting a security risk. The code risk assessment system 130 may determine that a code segment has been assigned a risk value by the first code-specific machine learning model, but not by the second code-specific machine learning model, and the routine 400 returns to block 408 to apply the code segment to the second code-specific machine learning model.

Alternatively, the code risk assessment system 130 may determine that inputs to the second code-specific machine learning model are to be formatted differently, and the routine 400 returns to block 406 where the code preprocessing system 237 may divide the code into a different plurality of code segments. For example, the second code-specific machine learning model may have a different input size limit than the first code-specific machine learning model. In another example, the first code-specific machine learning model may have keywords associated with identifying cross-site scripting vulnerabilities. In this example, the code preprocessing system 237 may have generated a first set of code segments having windows centered on the keywords. The second code-specific machine learning model may use a different set of keywords, and the code preprocessing system 237 may generate a second set of code segments having windows defined by the keywords associated with the second code-specific machine learning model. In some embodiments, each of the code-specific machine learning models may be used to analyze the code segments of the software code in parallel or serially, and the routine 400 may proceed from block 410 to 414.

At block 414, the code risk assessment system 130 determines an application risk value based on the code risk values generated by the code risk evaluation system 239 for each code segment. To generate the application risk value, the code risk assessment system 130 may compare the code risk values to a threshold value, and provide an application risk value based on whether the code risk values exceed the threshold value. For example, the code risk assessment system 130 may determine a number of code segments having a high risk assessment (e.g., a red risk assessment on a color scale where red is the highest risk level, a risk assessment of 5 or higher on a numerical scale from 1-10 indicating increasing risk levels, etc.), and compare the number to a threshold. In this example, when the number of code segments having a high risk assessment exceeds the threshold, the code risk assessment system 130 assigns the application a high application risk value. The threshold may be, for example, a percentage of code segments having a minimum code risk value (e.g., code segments having a 5 or higher code risk value on a numerical scale from 1-10 where increasing numbers indicate increasing risk), an average code risk value of the code segments, a median code risk value of the code segments. Alternatively, the threshold may be dynamically determined, for example based on a risk type. For example, the threshold for assigning a high application risk value may be set lower for applications interacting with personally identifiable information. In another example, the threshold may be determined based on calculating a geometric mean for code risk values which indicates a number of code risk values likely to be associated with a particular application risk value.

Where a first code segment and a second code segment include at least a portion of the same software code, the code risk value for some or all of the code segments including the portion of the same software code may be determined to be the highest risk value. For example, if the first code segment is assigned a high code risk value by a first machine learning model configured to identify a first type of risk, and the second code segment is assigned a low risk value by a second machine learning model configured to identify a second type of risk, each code segment may be assigned a high risk value. Assigning the same risk value to each code segment may allow for more efficient determination of a likely risk value associated with the code segments, and minimize the risk of under-classifying the risk associated with a code segment. In another example, where two or more machine learning models have generated risk values for a same code segment, the risk values from each machine learning model may be averaged to generate an average risk value for the code segment. Alternatively, the code risk assessment system 130 may weight the risk value of a first machine learning model differently from the risk value of a second machine learning model. The code risk assessment system 130 may then generate a weighted average risk value for the code segment.

In some embodiments, a plurality of thresholds may be used to determine application risk value, where various application risk values have associated thresholds for code risk values (e.g., 3-5% of code segments having a high code risk value leads to an application risk value of moderate, and over 5% of code segments having a high code risk value leads to an application risk value of high). Similarly to code risk values, application risk values may be indicated in various ways, including a plain language description of the risk, a color scale, a numerical scale, or any other indication representing a risk level of associated with the application. Further, the code risk assessment system 130 may determine a reason associated with the code risk value. The reason may indicate, for example, a type of security vulnerability, a cross site scripting vulnerability, and/or a new security vulnerability not previously identified or classified. Where there is a single code segment, the application risk value may be the code risk value.

At block 416, the code risk assessment system 130 determines a remedial action based on the application risk value. The remedial action may be selected by the code risk assessment system 130 based on, for example, a type of risk indicated by the assessment of the source code, a level of risk indicated by the assessment of the source code, a code segment evaluated to present a high risk (e.g., a risk score associated with the code segment being above a threshold), or any other information associated with at least a code segment of the source code determined based on the assessment of the source code by the code risk assessment system 130. Examples of remedial actions include, but are not limited to, providing trend information for a change in application risk value over time, modifying the software code of the application under test, publishing the software code, preventing publication of the software code, performing an additional vulnerability scan or risk assessment on at least a portion of the software code, transmitting a notification to the requesting system 120 indicating the application risk value, transmitting a notification to the requesting system 120 indicating the application risk value differs from a previously assigned application risk value, updating a stored application risk value, transmitting an indication the application requires additional review, generating a user interface prompt for a user before the application under test is committed to a software repository (e.g., requesting confirmation of the intent to commit the application under test and including an indication of the application risk value), and/or limiting the ability of the application under test to access data (e.g., sensitive data, data associated with application and/or system security, etc.). Limiting the ability of the application under test to access data may include, for example, revoking an API key, revoking access privileges associated with an identifier of the application under test, or otherwise preventing access to data for the application under test. A remedial action, as used herein, may also include the code risk assessment system 130 doing nothing, for example in response to determining that an application risk value does not indicate a likely risk, and/or determining the current application risk value has not changed from a previously stored application risk value.

For example, modifying the software code of the application under test may include automated replacement of a portion of the software code identified as being high risk. The portion may be replaced by identifying a cause of the high risk assessment, such as the use of single-factor authentication, and then identifying a code segment which performs a related function in a manner that reduces overall risk, such as a code segment implementing multi-factor authentication. In another example, preventing publication of the software code may cause the software code to remain, or become, inaccessible for further use except for development purposes, thereby limiting the chance that the application will cause harm. Indicating the application risk value differs from a previously or manually assigned application risk value may involve accessing the previously assigned application risk value. The code risk assessment system 130 may then compare the currently assessed application risk value to the previously assigned application risk value. When the two application risk values differ, the code risk assessment system 130 may generate an alert for a user, or a system, warning that the previously assigned application risk value is incorrect. In some cases, the warning may be issued if the automatically determined risk value indicates a higher level of risk than a manually assigned risk value. Further, the code risk assessment system 130 may take additional actions, such as removing the application from public use, based on the difference between the two application risk values. Limiting the ability of the application under test to access data may include, for example, removing the application's ability to access a private key used to access secure or private data storage locations, removing a signed certificate associated with the application, or changing a setting such that the application may only be run in a sandboxed environment separated from potentially secure or private information.

At block 418, the code risk assessment system 130 executes a remedial action, for example a remedial action described in reference to block 416. When the remedial action has been executed by the code risk assessment system 130, the routine 400 moves to block 420 and ends.

Execution Environment

FIG. 5 illustrates various components of an example code risk assessment system 130 configured to implement various functionality described herein.

In some embodiments, the code risk assessment system 130 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the code risk assessment system 130 may be implemented as web services consumable via one or more communication networks. In further embodiments, the code risk assessment system 130 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment In some embodiments, as shown, a code risk assessment system 130 may include: one or more computer processors 502, such as physical central processing units ("CPUs"); one or more network interfaces 504, such as a network interface cards ("NICs"); one or more computer readable medium drives 506, such as a high density disk ("HDDs"), solid state drives ("SSDs"), flash drives, and/or other persistent non-transitory computer readable media; one or more input/output device interfaces 508; and one or more computer-readable memories 510, such as random access memory ("RAM") and/or other volatile non-transitory computer readable media.

The computer-readable memory 510 may include computer program instructions that one or more computer processors 502 execute and/or data that the one or more computer processors 502 use in order to implement one or more embodiments. For example, the computer-readable memory 510 can store an operating system 512 to provide general administration of the code risk assessment system 130. As another example, the computer readable memory 510 can store a code preprocessing system 237. As another example, the computer-readable memory 510 can store a code risk evaluation system 239.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:

a computer-readable memory configured to store a plurality of code-specific large language models (LLM) capable of interpreting software code, wherein each code-specific LLM of the plurality of code-specific LLMs is configured to identify a respective risk type of a plurality of risk types; and one or more processors configured to execute computer-executable instructions to at least:

receive a request to perform a risk analysis of an application under test, wherein the request includes an identity of the application under test;

access software code corresponding to the application under test from a code repository;

determine an input size limit of the code-specific LLM;

divide the software code into a plurality of code segments based at least in part on the input size limit, wherein a size of each code segment of the plurality of code segments satisfies the input size limit of the code-specific LLM;

generate a plurality of code risk values by at least evaluating, using at least two code-specific LLMs of the plurality of code-specific LLMs, each code segment of the plurality of code segments to obtain a code risk value for the code segment of the plurality of code segments, wherein a first code risk value of the plurality of code risk values is associated with a first risk type, wherein a second code risk value of the plurality of code risk values is associated with a second risk type, and wherein the first risk type is different from the second risk type;

determine an application risk value of the application under test based at least in part on the plurality of code risk values;

based at least in part on the application risk value, determine a remedial action; and execute the remedial action.

2. The system of claim 1, wherein the application risk value is determined based at least in part on an identified sensitivity of data.

3. The system of claim 1, wherein sensitive data comprises at least one of: personally identifiable information, financial information, data stored in a secure data storage location, information associated with an effect on human safety, or a private cryptographic key.

4. The system of claim 1, wherein a code risk value of the code segment is determined by the code-specific LLM based at least in part on a determination of whether an authentication process is performed by the code segment.

5. The system of claim 1, wherein the one or more processors are further configured to execute the computer-executable instructions to at least:

access an assigned risk value of the application under test; and determine that the application risk value does not match the assigned risk value by at least comparing the application risk value to the assigned risk value, wherein the remedial action comprises generating an alert indicating that the assigned risk value does not match the application risk value.

6. The system of claim 1, wherein the one or more processors are further configured to execute the computer-executable instructions to at least identify a code segment of the plurality of code segments for additional review based at least in part on a code risk value assigned to the code segment, wherein the remedial action comprises at least transmitting a request for additional review of the code segment of the plurality of code segments to a reviewer.

7. A method comprising:

by a hardware processor of a computing device, receiving a request to perform a risk analysis of an application;

accessing software code corresponding to the application from a code repository;

generating an application risk value for the software code by at least evaluating the software code using at least two machine learning models of a plurality of machine learning models each configured to identify a respective risk type of a plurality of risk types, wherein generating the application risk value comprises evaluating the software code using a first machine learning model of the plurality of machine learning models configured to determine a first code risk for code of a first risk type of the plurality of risk types and a second machine learning model of the plurality of machine learning models configured to determine a second code risk for code of a second risk type of the plurality of risk types different from the first risk type, wherein the first machine learning model is different from the second machine learning model;

based at least in part on the application risk value, determining a remedial action; and executing the remedial action.

8. The method of claim 7, wherein the first machine learning model has an input size limit and wherein generating the application risk value further comprises:

dividing the software code into a plurality of code segments based at least in part on the input size limit, wherein a size of each code segment of the plurality of code segments satisfies the input size limit of the first machine learning model;

generating a plurality of code risk values by applying each code segment to the first machine learning model to obtain a code risk value for the code segment; and determining the application risk value based at least in part on the plurality of code risk values and the second code risk.

9. The method of claim 8, wherein determining the application risk value based at least in part on the plurality of code risk values comprises determining whether a number of code risk values indicating a high risk satisfies a threshold value.

10. The method of claim 7, wherein the remedial action is determined based at least in part on the application risk value, and wherein executing the remedial action comprises replacing a portion of the software code identified as having a high risk value with an alternative code segment having a lower risk value.

11. The method of claim 7, wherein the remedial action is determined based at least in part on the application risk value, and wherein executing the remedial action comprises preventing publication of the software code to prevent further use of the software code.

12. The method of claim 7, wherein the remedial action is determined based at least in part on the application risk value, and wherein executing the remedial action comprises at least one of: publishing the software code, providing an alert that the application risk value is different from a stored application risk value, or requesting an additional vulnerability scan of the software code from a vulnerability analysis system.

13. The method of claim 7, wherein the first risk type and the second risk type each correspond to a risk associated with one or more of: a vulnerability, unauthorized data access, or unsecure data storage.

14. The method of claim 7, wherein the first code risk corresponds to the first risk type, wherein the second code risk corresponds to the second risk type, and wherein the first risk type and the second risk type differ.

15. A system comprising:

a computer-readable memory; and one or more processors configured to execute computer-executable instructions to at least:

access software code corresponding to an application from a code repository;

generate an application risk value for the software code by at least evaluating the software code using at least two machine learning models of a plurality of machine learning models each configured to identify a respective risk type of a plurality of risk types, wherein generating the application risk value comprises evaluating the software code using a first machine learning model of the plurality of machine learning models configured to determine a first code risk for code of a first risk type of the plurality of risk types and a second machine learning model of the plurality of machine learning models configured to determine a second code risk for the code of a second risk type of the plurality of risk types different from the first risk type, wherein the first machine learning model is different from the second machine learning model;

determine that the application risk value exceeds a threshold; and in response to determining that the application risk value exceeds the threshold, execute a remedial action.

16. The system of claim 15, wherein the first machine learning model is a code-specific large language model (LLM).

17. The system of claim 16, wherein the code-specific LLM is further configured to generate a reasoning for the application risk value determined for the software code, and wherein the remedial action comprises providing the reasoning for presentation via a user interface to a user.

18. The system of claim 16, wherein the application risk value is determined based at least in part on the LLM identifying a new vulnerability in the software code based at least in part on a threshold similarity between a code segment and a known vulnerability.

19. The system of claim 15, wherein the remedial action comprises providing a portion of the software code associated with the determination of the application risk value to a requesting system.

20. The system of claim 15, wherein the one or more processors are further configured to execute the computer-executable instructions to at least compare the application risk value to a known application risk value to generate a comparison result, and wherein the remedial action comprises providing the comparison result for presentation via a user interface to a user.

* * * * *